United States Patent
Ohtani et al.

(10) Patent No.: US 8,519,341 B2
(45) Date of Patent: Aug. 27, 2013

(54) RADIATION TOMOGRAPHY APPARATUS

(75) Inventors: Atsushi Ohtani, Kyoto (JP); Masaharu Amano, Ibaraki (JP); Yoshihiro Inoue, Kyoto (JP); Kazumi Tanaka, Otsu (JP); Tetsuro Mizuta, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 218 days.

(21) Appl. No.: 13/145,412

(22) PCT Filed: Jan. 30, 2009

(86) PCT No.: PCT/JP2009/000362
§ 371 (c)(1),
(2), (4) Date: Jul. 20, 2011

(87) PCT Pub. No.: WO2010/086899
PCT Pub. Date: Aug. 5, 2010

(65) Prior Publication Data
US 2011/0274241 A1 Nov. 10, 2011

(51) Int. Cl.
*G01T 1/166* (2006.01)
(52) U.S. Cl.
USPC ............... 250/363.04; 378/4; 378/9; 382/131
(58) Field of Classification Search
USPC ............... 250/363.01–363.09, 363.1, 370.11; 382/131; 378/4, 9, 177; 702/19
See application file for complete search history.

(56) References Cited

U.S. PATENT DOCUMENTS

| | | | | |
|---|---|---|---|---|
| 3,808,440 A | * | 4/1974 | Petit-Clerc | 250/363.03 |
| 5,291,021 A | * | 3/1994 | Tanaka et al. | 250/363.03 |
| 5,608,221 A | * | 3/1997 | Bertelsen et al. | 250/363.03 |
| 5,703,369 A | * | 12/1997 | Mori | 250/363.03 |
| 7,501,633 B2 | * | 3/2009 | Matsuzaki et al. | 250/363.03 |
| 2002/0179843 A1 | * | 12/2002 | Tanaka et al. | 250/363.03 |
| 2003/0108229 A1 | * | 6/2003 | Tanaka et al. | 382/131 |
| 2003/0118155 A1 | * | 6/2003 | Ueno et al. | 378/177 |
| 2004/0124360 A1 | * | 7/2004 | Levin | 250/363.04 |
| 2007/0135702 A1 | * | 6/2007 | Matsuzaki et al. | 600/407 |
| 2008/0056432 A1 | * | 3/2008 | Pack et al. | 378/4 |

(Continued)

FOREIGN PATENT DOCUMENTS

| | | |
|---|---|---|
| JP | 58-14072 A | 1/1983 |
| JP | 2001-194459 A | 7/2001 |
| JP | 2003-190135 A | 7/2003 |
| JP | 2008-267913 A | 11/2008 |

OTHER PUBLICATIONS

International Search Report for the Application No. PCT/JP2009/000362 mailed Mar. 3, 2009.

*Primary Examiner* — David Porta
*Assistant Examiner* — Taeho Jo
(74) *Attorney, Agent, or Firm* — Cheng Law Group, PLLC (57) ABSTRACT

This invention has one object to provide radiation tomography apparatus that allows suppression of arithmetic load of detection data with a wider detector ring. In order to achieve this purpose, the radiation tomography apparatus according to this invention performs coincidence only when two scintillation counter crystals that detect gamma rays coincidentally (A) belong to the same ring unit, or (B) belong to each of the ring units adjacent to each other. Accordingly, a distance in the central axis direction between the radiation detecting elements is limited to be equal to or less than a thickness of the ring unit in the central axis direction. Accordingly, radiation tomography apparatus may be provided that allows generation of the sectional image suitable for diagnosis while arithmetic load is suppressed.

8 Claims, 9 Drawing Sheets

(56) References Cited

U.S. PATENT DOCUMENTS

2008/0317197 A1* 12/2008 Matsuzaki et al. ............... 378/9
2009/0012718 A1* 1/2009 Ohtani et al. ............... 702/19
2010/0284600 A1* 11/2010 Yamada ..................... 382/131
2011/0278443 A1* 11/2011 Mizuta et al. .............. 250/252.1

* cited by examiner

RADIATION TOMOGRAPHY APPARATUS

TECHNICAL FIELD

This invention relates to radiation tomography apparatus that images radiation. Particularly, this invention relates to radiographic apparatus having a field that is wide enough to image a body portion of a subject at one time.

BACKGROUND ART

In medical fields, radiation emission computed tomography (ECT: Emission Computed Tomography) apparatus is used that detects an annihilation radiation (for example, gamma rays) pair emitted from radiopharmaceutical that is administered to a subject and is localized to a site of interest for acquiring sectional images of the site of interest in the subject showing radiopharmaceutical distributions. Typical ECT equipment includes, for example, a PET (Positron Emission Tomography) device and an SPECT (Single Photon Emission Computed Tomography) device.

A PET device will be described by way of example. The PET device has a detector ring with block radiation detectors arranged in a ring shape. The detector ring is provided for surrounding a subject, and allows detection of radiation that is transmitted through the subject.

Figure 10:
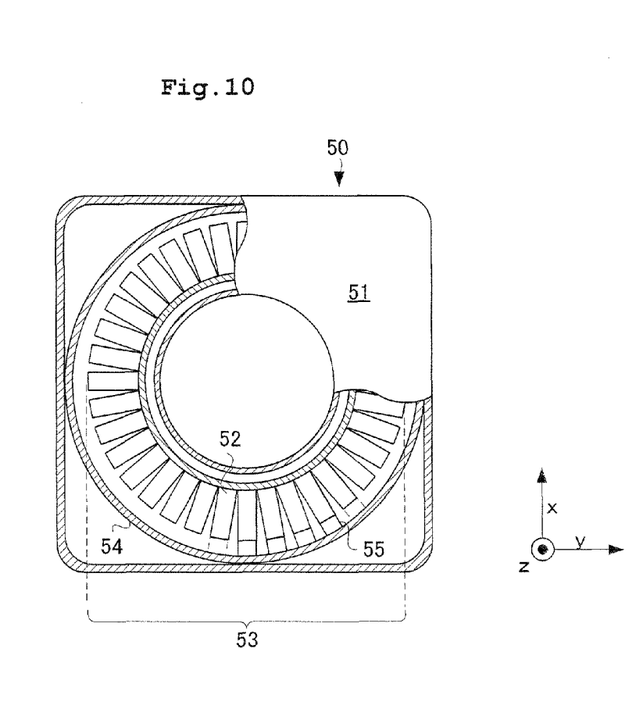
FIG. 10 is a view showing a configuration of the conventional PET device.

Such radiation detector arranged in the detector ring of the PET device is often equipped that allows position discrimination in a depth direction of a scintillator provided in the radiation detector for improved resolution. First, description will be given of a configuration of a conventional PET device. As shown in FIG. 10, a conventional PET device 50 includes a gantry 51 with an introducing hole that introduces a subject, a detector ring 53 having block radiation detectors 52 for detecting radiation being arranged inside the gantry 51 as to surround the introducing hole, and a support member 54 provided as to surround the detector ring 53. Each of the radiation detectors 52 has a bleeder unit 55 with a bleeder circuit. The bleeder unit 55 is provided between the support member 54 and the radiation detector 52 for connecting the support member 54 and the radiation detector 52. Such PET device is described, for example, in Patent Literature 1.

Figure 11:
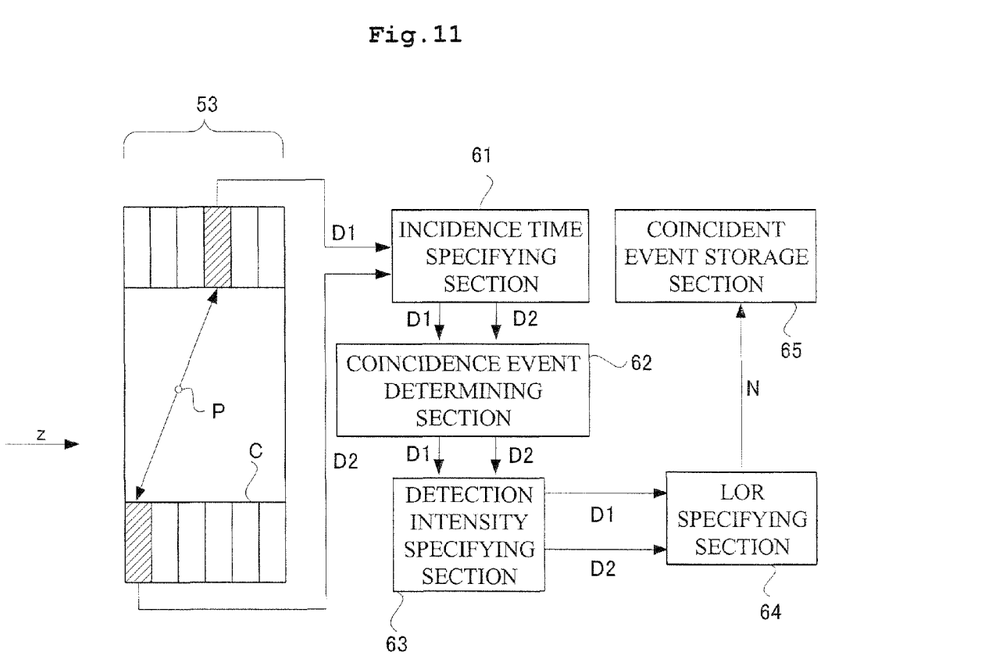
FIG. 11 is a functional block diagram showing a configuration of the conventional PET device.

The PET device determines annihilation radiation pairs emitted from radiopharmaceutical. Specifically, an annihilation radiation pair emitted from inside of a subject M is a radiation pair having traveling directions opposite by 180 degrees. As shown in FIG. 11, the detector ring 53 has detecting elements C arranged in a z-direction for detecting an annihilation radiation pair. Accordingly, a position of the annihilation radiation pair relative to the detector ring 53 may be discriminated in the z-direction.

Description will be given of a determining method of the annihilation radiation pair in such PET device. As shown in FIG. 11, an annihilation radiation pair is generated at a vanishing point P inside the subject, and enters into two different detecting elements C of the detector ring 53. The two detecting elements independently send out two pieces of detection data D1 and D2 to an incidence time specifying section 61, where an incident time of each detection data D1, D2 into the detector ring 53 is specified.

Subsequently, the detection data D1 and D2 is outputted to a coincidence event determining section 62. The coincidence event determining section 62 determines whether incidence of radiation that the detection data D1, D2 indicates has been performed coincidentally. Where it is determined that the detection data D1, D2 has entered into the detector ring 53 coincidentally, pairing is conducted to the detection data D1, D2, and it is determined that each results from a single phenomenon of occurrence of an annihilation radiation pair. The detection data D1, D2 is sent to a detection intensity specifying section 63 and an LOR specifying section 64. The detection intensity specifying section 63 calculates intensity of incident radiation from the detection data D1 and D2. The LOR specifying section 64 specifies positional information of the detection data D1, D2. Vector data N is associated with calculated incidence time, positional information, and detection intensity. The vector data N is stored in a coincident event storage section 65 for use in generating a sectional image of the subject.

[Patent Literature 1]
Japanese Patent Publication No. 2001-194459

DISCLOSURE OF THE INVENTION

Summary of the Invention

However, the radiation tomography apparatus with the conventional configuration has the following drawbacks. Specifically, a longer detector ring 53 in the z-direction may cause a problem that calculation becomes greatly complicated. Recently, radiation tomography apparatus has been developed having the wide detector ring 53 as to cover the entire of the subject. With such configuration, more detecting elements than conventional are arranged in the detector ring 53. Accordingly, there are many combinations of two different detecting elements in the detector ring 53, which is not conceivable in the conventional apparatus. In taking a sectional image under consideration of the number of coincidence events for all these combinations, arithmetic load in each section 61, 62, 63, 64, 65 will highly increase. This state is left, which leads to necessity of an expensive arithmetic unit for acquiring the sectional image of the subject M and longer time for generating the sectional image.

This invention has been made regarding the state of the art noted above, and its object is to provide radiation tomography apparatus that allows suppression of arithmetic load of detection data with a wider detector ring.

Means For Solving The Problem

This invention is configured as stated below to achieve the above object. Radiation tomography apparatus according to this invention is provided including a detector ring formed by arranging two or more ring units as to share central axes of the two or more ring units, the two or more ring units each being formed by arranging unit detector rings having radiation detecting elements for detecting radiation arranged annularly as to share central axes of the unit detector rings; a direct coincidence device for counting a number of coincidence events as a number of times that two different radiation detecting elements belonging to one of the two or more ring units detect radiation coincidentally; a cross coincidence device included that is connected to both a first ring unit and a second ring unit adjacent to each other, and counts a number of coincidence events as a number of times that two different radiation detecting elements belonging to each of the first ring unit and the second ring unit detect radiation coincidentally only when a distance between two radiation detecting elements in a direction of the central axes is equal to or less than a given length; a given length storage device for storing the given length; and an input device for inputting the given length, the given length being variable in accordance with input by the input device.

[Operation and Effect]

The configuration of this invention includes two or more ring units. Each of the ring units is provided with the direct coincidence device. The direct coincidence device counts the number of coincidence events for the ring units. In addition to this, this invention includes the cross coincidence device connected to both the ring units adjacent to each other. The cross coincidence device counts the number of coincidence events only when two radiation detecting elements belonging to the first ring unit and the second ring unit, respectively, adjacent to each other coincidentally detect radiation.

The effect concerning this invention is as follows. Firstly, the direct coincidence device is provided per ring unit, which may avoid complicated calculation even when the detector ring has a large width. In other words, the detector ring in this invention may be formed through connecting the ring units having a similar configuration to the radiographic apparatus conventionally used. In so doing, two or more direct coincidence devices share performance of coincidence per ring unit in the radiation tomography apparatus concerning this invention even when the detector ring becomes wider and the number of radiation detecting elements increases. Consequently, arithmetic load concerning per direct coincidence device never varies independent of the increased number of ring units.

The configuration of this invention further includes the cross coincidence device. When the ring units are connected, annihilation radiation may enter into each of the ring units adjacent to each other. According to this invention, the cross coincidence device counts the number of annihilation radiation pairs. Consequently, the counted annihilation radiation pairs used for generation of the sectional image increase in number.

With the foregoing configuration having the direct coincidence device and cross coincidence device, only annihilation radiation pairs may be selectively counted that are suitable for generating the sectional image. Assumed that two radiation detecting elements detect radiation coincidentally in the detector ring. Then, the larger the distance between the radiation detecting elements becomes in the central axis direction, the fewer the detection frequency becomes and the lower the radiation detection sensitivity becomes. Thus, it is preferable not to consider combination of such radiation detecting elements originally in a coincidence step. According to this invention, coincidence is performed only when two radiation detecting elements that detect radiation coincidentally (A) belong to the same ring unit, or (B) belong to each of the ring units adjacent to each other. Accordingly, the distance in the central axis direction between the radiation detecting elements that perform coincidence is limited to be equal to or less than a thickness of the ring unit in the central axis direction. With the configuration of this invention, an annihilation radiation pair that is not suitable for generation of the sectional image is not originally under consideration. Consequently, radiation tomography apparatus may be provided that allows generation of the sectional image suitable for diagnosis while arithmetic load is suppressed.

Such configuration may realize further suppression of arithmetic load in the radiation tomography apparatus. Specifically, although two radiation detecting elements that detect radiation coincidentally belong to each of the ring units adjacent to each other, the cross coincidence device performs coincidence only when the distance therebetween is equal to or less than the given length. Such configuration may provide radiation tomography apparatus with further suppressed arithmetic load.

Such configuration may realize control of arithmetic load by the coincidence device in generating the sectional image. Accordingly, an imaging method may be controlled in accordance with resolution necessary for the sectional image.

Moreover, it is more preferable that the foregoing detector ring may be mechanically disassembled per ring unit.

[Operation and Effect]

Such configuration may provide radiation tomography apparatus with easier maintenance and simple installation in an examination room. According to the foregoing configuration, the detector ring may be divided into two or more ring units for transportation. Moreover, when the radiation tomography apparatus is out of order, inside of the detector ring may readily be inspected. That is because the detector ring may be divided per ring unit. Moreover, the detection ring may be repaired through replacing a ring unit.

Moreover, the foregoing radiation tomography apparatus includes a list memory device for memorizing a list in which combination of two radiation detecting elements is listed, and a counting instruction device for instructing execution of counting to the cross coincidence device. When two radiation detecting elements belonging to the first ring unit and the second ring unit coincidentally detect radiation, the counting instruction device instructs execution of counting to the cross coincidence device only when the combination of two detecting elements is in the combination list. Such configuration is more preferable.

[Operation and Effect]

The above construction represents a specific embodiment of the tomography apparatus according to this invention. That is, according to this configuration, execution of counting is instructed to the cross coincidence device with use of the combination list in which combination of two radiation detecting elements is listed. In so doing, the cross coincidence device may perform coincidence only when combination of the two detecting elements that detect radiation coincidentally is memorized in the combination list. Only a pair of radiation detecting elements having a distance equal to or less than the given length may be listed up in the combination list. Accordingly, the two radiation detecting elements easily have a distance therebetween of equal to or less than the given length in the central axis direction.

Moreover, a list generation device is preferably provided for generating the combination list based on the foregoing given length.

[Operation and Effect]

With such configuration, even when the given length varies, a combination list may be acquired in accordance with the variation. Consequently, radiation tomography apparatus may be provided under variation of the given length that allows generation of the sectional image suitable for diagnosis while arithmetic load is suppressed.

Moreover, the foregoing radiation tomography apparatus further includes a top board that extends in the central axis direction and is inserted into an inside portion of the detector ring. Additionally, the radiation tomography apparatus further includes an image generation device having (A) a radiation source that allows rotation relative to the top board around the central axis, (B) a radiation detecting device that allows rotation relative to the top board around the central axis, (C) a support device for supporting the radiation source and the radiation detecting device, (D) a rotating device for rotating the support device, and (E) a rotation control device for controlling the rotating device.

[Operation and Effect]

According to the above configuration, radiation tomography apparatus may be provided that allows acquisition of both images of an internal subject structure and pharmaceutical distribution. In general, a PET device may obtain information on pharmaceutical distribution. However, it may sometimes be necessary to conduct diagnosis referring to the sectional image having internal organs and tissue of the subject falling therein. According to the above configuration, both images of the internal subject structure and pharmaceutical distribution may be acquired. Consequently, superimposing both images may realize generation of a composite image suitable for diagnosis.

Effect of the Invention

According to this invention, burden of the coincidence device may be reduced. Specifically, the configuration of this invention is provided with the direct coincidence device per ring unit. Two or more direct coincidence devices share performance of coincidence per ring unit in the radiation tomography apparatus concerning this invention. Consequently, arithmetic load concerning per direct coincidence device never varies independent of the increased number of ring units. The configuration of this invention is also provided with the cross coincidence device. Accordingly, the number of counted annihilation radiation pairs increases that are used for generating the sectional image.

According to this invention, coincidence is performed only when two radiation detecting elements that detect radiation coincidentally (A) belong to the same ring unit, or (B) belong to each of the ring units adjacent to each other. Accordingly, the distance in the central axis direction between the radiation detecting elements that perform coincidence is limited to be equal to or less than a thickness of the ring unit in the central axis direction. With the configuration of this invention, an annihilation radiation pair that is not suitable for generating the sectional image is not originally under consideration. Consequently, radiation tomography apparatus may be provided that allows generation of the sectional image suitable for diagnosis while arithmetic load is suppressed.

DESCRIPTION OF REFERENCES

C . . . scintillation counter crystal (radiation detecting element)

9 . . . radiation tomography apparatus
10 . . . top board
12b . . . unit detector ring
20c . . . C-coincidence section (cross coincidence device)
20d D-coincidence section (direct coincidence device)
25 . . . C-list reference section (counting instruction device)
26c . . . C-list memory section (list memory device)
27 . . . list generation section (list generation device)
37 . . . MRD storage section (given length storage device)
38 . . . input unit (input device)
39 . . . rotating mechanism (rotating device)
40 . . . rotation controller (rotation control device)
43 . . . X-ray tube (radiation source)
44 . . . FPD (radiation detecting device)
47 . . . support portion (support device)
121 . . . ring unit (first ring unit)
122a, 122b . . . ring unit (second ring unit)

BEST MODE FOR CARRYING OUT THE INVENTION

Description will be given hereinafter of the best mode of a method of collecting calibration data in radiation tomography apparatus according to this invention with reference to the drawings. Gamma rays to be described hereinafter are an example of radiation in this invention. This invention is adapted for a PET device in Embodiment 1 and Embodiment 2, and is adapted for PET/CT apparatus in Embodiment 3.

Embodiment 1

<Whole Configuration of Radiation Tomography Apparatus>

Figure 1:
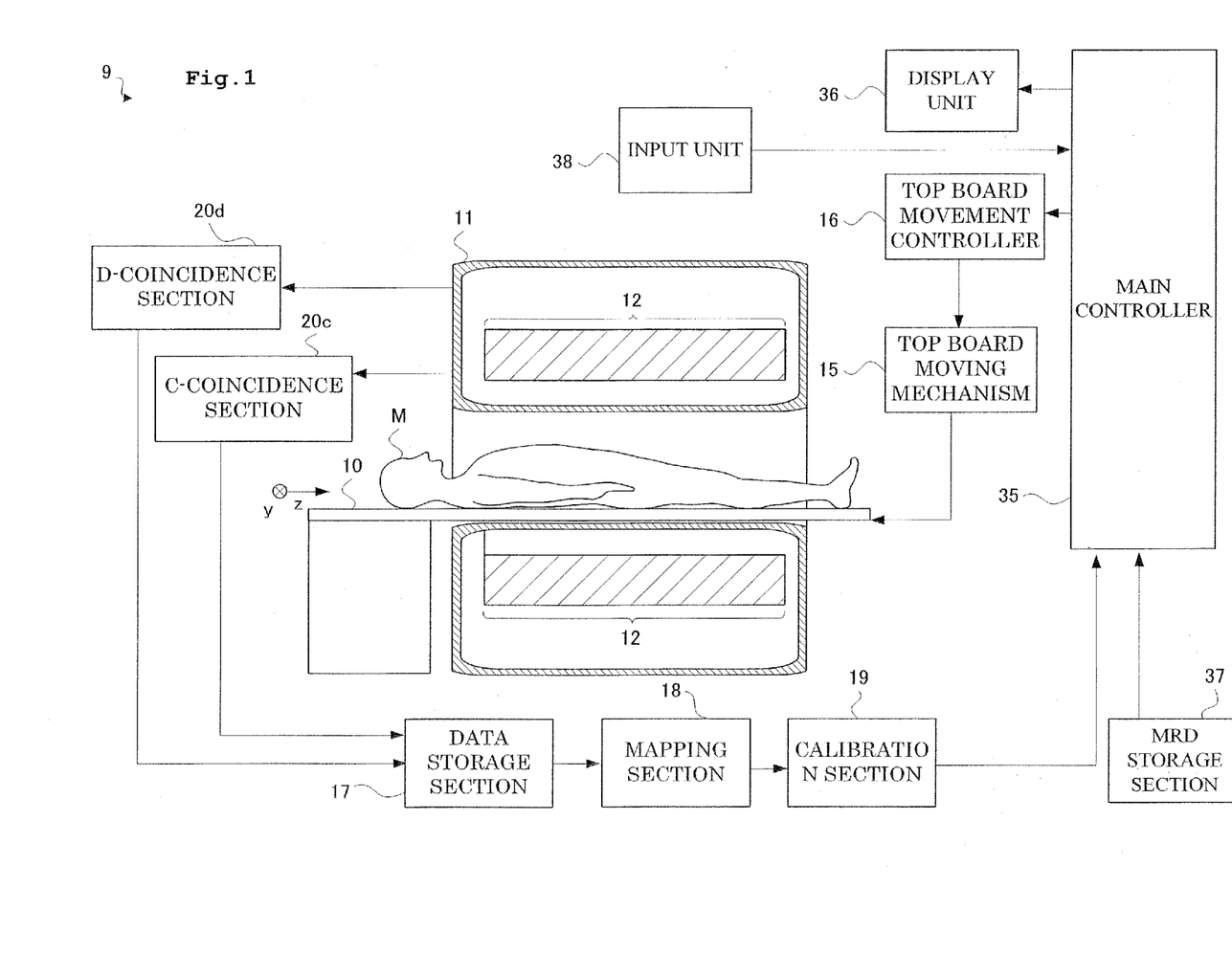
FIG. 1 is a functional block diagram showing a configuration of radiation tomography apparatus according to Embodiment 1.

Each embodiment of radiation tomography apparatus according to this invention will be described hereinafter with reference to the drawings. FIG. 1 is a functional block diagram showing a configuration of radiation tomography apparatus according to Embodiment 1. As shown in FIG. 1, the radiation tomography apparatus 9 according to Embodiment 1 includes a top board 10 for placing a subject M on the back thereof, and a gantry 11 with a through hole for surrounding the subject M. The top board 10 is provided as to pass through an opening of the gantry 11. The top board 10 freely moves in and out along a direction where the opening of the gantry 11 extends (z-direction.) A top board moving mechanism 15 slides the top board 10 as above. A top board movement controller 16 controls the top board moving mechanism 15.

The gantry 11 includes a detector ring 12 inside thereof that detects annihilation gamma-ray pairs from the subject M. The detector ring 12 is tubular and extends in a body axis direction z of the subject M (corresponding to the extension direction of this invention.) The detector ring 12 has a length of 1 m to 1.8 m. That is, the detector ring 12 extends as to completely cover at least a body portion of the subject M.

Figure 2:
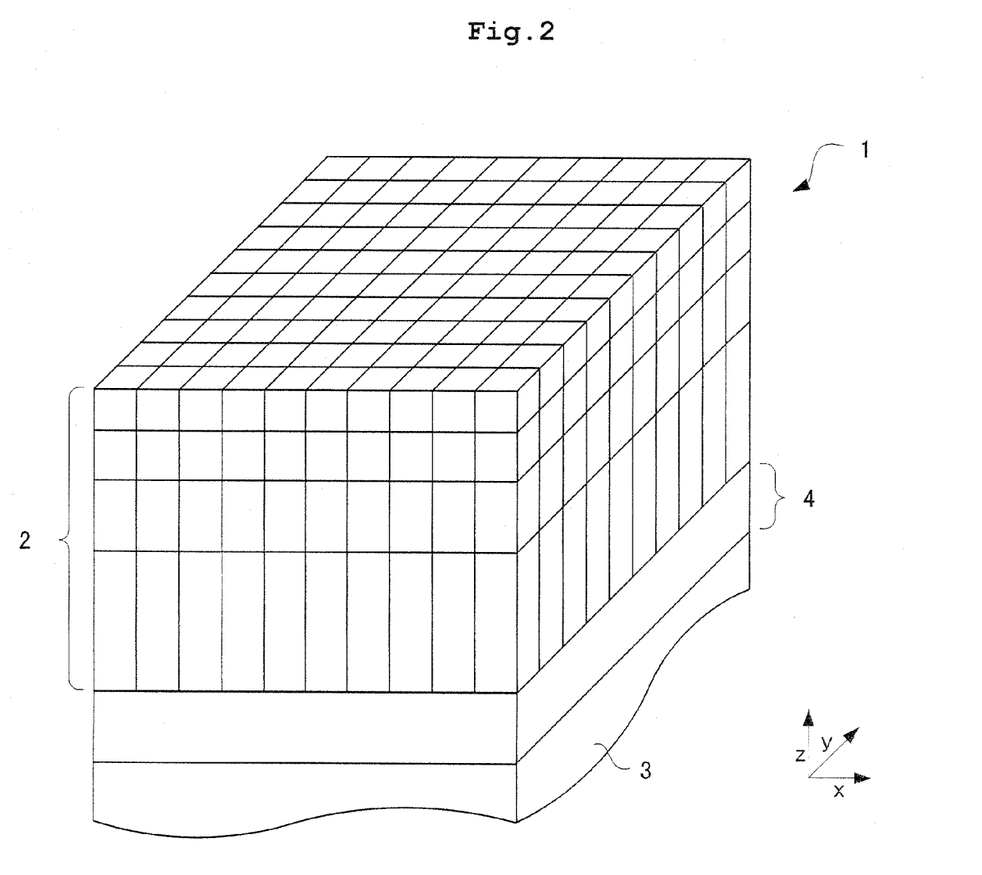
FIG. 2 is a perspective view showing a configuration of a radiation detector according to Embodiment 1.

The detector ring 12 has block radiation detectors 1 arranged in a ring shape. It is assumed that a width per one radiation detector 1 is approximately 5 cm. Approximately twenty to thirty-six radiation detectors 1 are to be arranged in the detector ring 12 in the z-direction. Next, simple description will be given of a configuration of the radiation detector 1. FIG. 2 is a perspective view showing a configuration of the radiation detector according to Embodiment 1. As shown in FIG. 2, the radiation detector 1 includes a scintillator 2 that converts radiation into fluorescence, and a light detector 3 that detects fluorescence. A light guide 4 is provided between the scintillator 2 and the light detector 3 for receiving fluorescence.

The scintillator 2 has two or more scintillation counter crystals arranged in a two-dimensional array. Each of the scintillation counter crystals C is composed of Ce-doped $Lu_{2(1-X)}Y_{2X}SiO_5$ (hereinafter referred to as LYSO.) The light detector 3 allows determination about which scintillation counter crystal emits fluorescence as well as intensity of fluorescence and time when fluorescence is generated. A scintillation counter crystal corresponds to a radiation detecting element of this invention.

Figure 3:
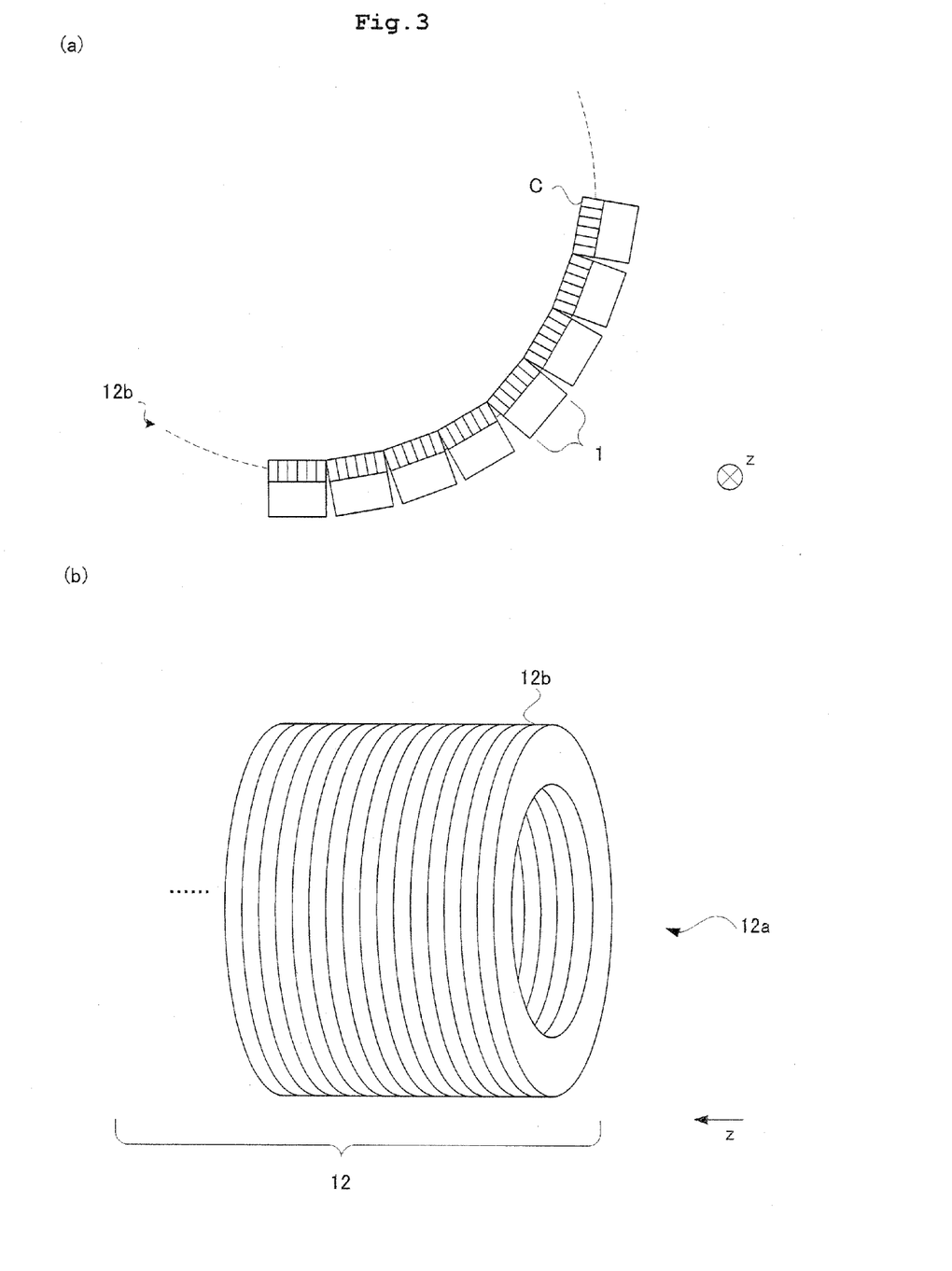
FIG. 3 is a view showing a configuration of a detector ring according to Embodiment 1.

Description will be given of a configuration of the detector ring 12. FIG. 3 is a view showing a configuration of the detector ring according to Embodiment 1. The radiation detectors 1 are arranged along an imaginary circle (exactly equilateral n-sided polygon) in the detector ring 12. Accordingly, the scintillation counter crystals are also arranged along an imaginary circle (exactly equilateral n-sided polygon) to form a unit detector ring 12b as shown in FIG. 3(a). The unit detector rings 12b are located in the same position with respect to the z-direction. The unit detector ring 12b is formed of scintillation counter crystals C (radiation detecting elements) arranged along a circular ring. That is, the unit detector ring 12b has the scintillation counter crystals arranged in one row, which is based on an independent concept from the radiation detector 1 arranged along the imaginary circle. Then, as shown in FIG. 3(b), the unit detector rings 12b are connected to one another in the z-direction to form the detector ring 12. In other words, the unit detector rings 12b are connected as to share a central axis along the z-direction. The unit detector ring 12b has a through hole at a center thereof. It may be considered that the unit detector rings 12b are arranged such that the through holes thereof are connected to one another to form the detector ring 12.

According to Embodiment 1, the detector ring 12 is formed in a circular ring shape by arranging around 100 radiation detectors 1. Consequently, the through hole 12a is of 100-sided polygon, for instance, seen thereof from the z-direction. In this case, two or more unit detector rings 12b are connected as to share each central axis thereof. The through hole 12a has a shape of a 100-sided prism.

Figure 4:
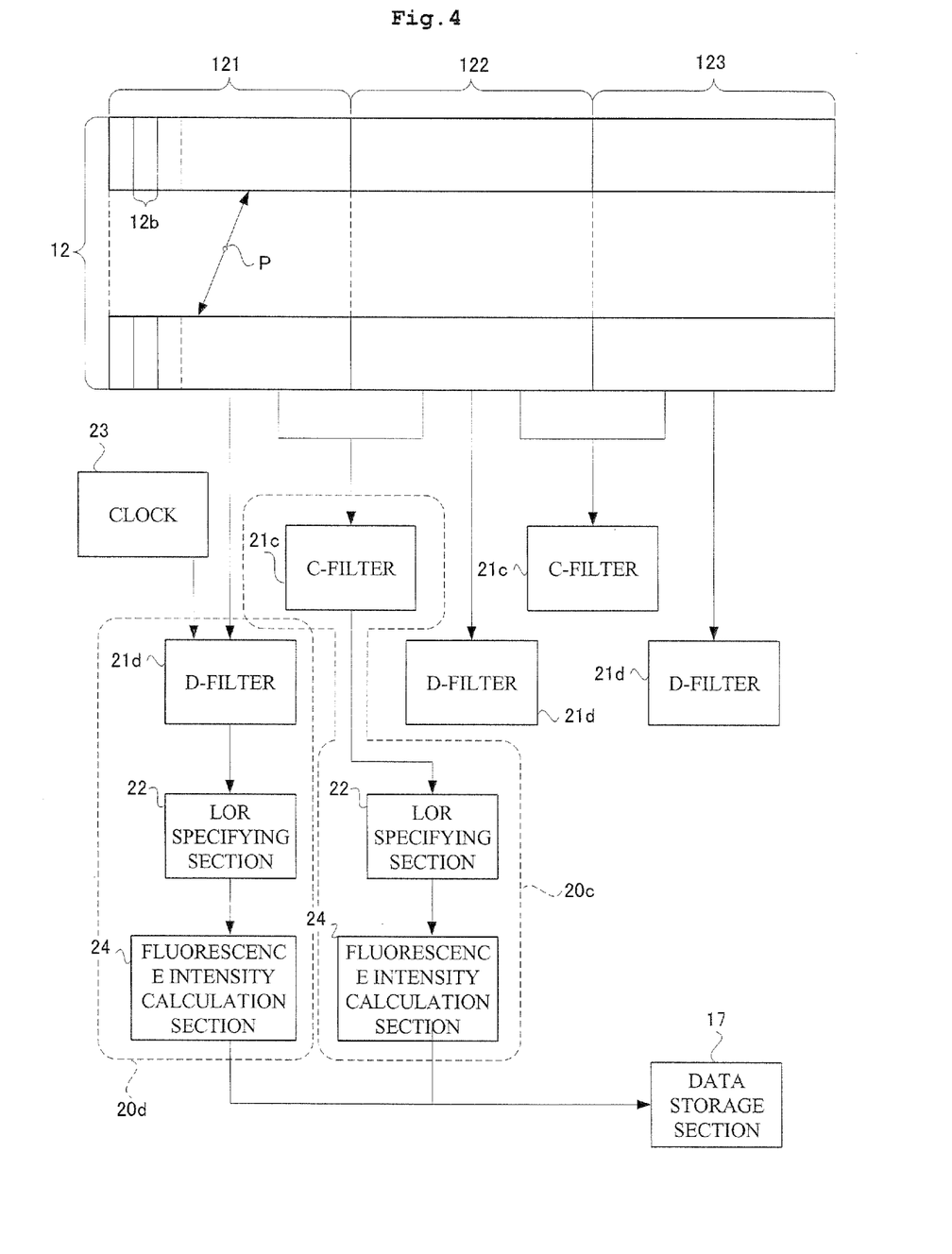
FIG. 4 is a view showing a configuration of a ring unit according to Embodiment 1.

The detector ring 12 has a plurality of ring units 121, 122, 123 connected to one another, as shown in FIG. 4. The ring unit has unit detector rings 12b mentioned above connected to one another in the z-direction. The ring unit 121 has around twelve radiation detectors 1 arranged in the z-direction. In other words, the ring units are connected as to share the central axis along the z-direction. Here, the detector ring 12 is formed by mechanically connecting the ring units 121, 122, 123 that are individually manufactured. Consequently, the detector ring 12 may be mechanically disassembled per ring unit. Moreover, the detector ring in FIG. 4 is formed of three ring units 121, 122, 123. This invention is not limited to this concerning the number of ring units that form the detector ring 12.

The radiation tomography apparatus 9 according to Embodiment 1 further includes each section for acquiring sectional images of the subject M, as shown in FIG. 1. Specifically, the radiation tomography apparatus 9 includes a C-coincidence section 20c and a D-coincidence section 20d each for performing coincidence of an annihilation gamma-ray pair in accordance with detection data detected in the detector ring 12, a data storage section 17 for storing the detection data, a mapping section 18 for generating a sectional image of the subject M, and a calibration section 19 for performing calibration to the sectional image of the subject M. The calibration section 19 is provided for removing a false image falling in the sectional image, and superimposes given calibration data on the sectional image of the subject M. In addition, an MRD storage section 37 stores MRD, mentioned later. The C-coincidence section corresponds to the cross coincidence device in this invention. The D-coincidence section corresponds to the direct coincidence device in this invention. Moreover, the MRD storage section corresponds to the given length storage device in this invention.

The radiation tomography apparatus 9 according to Embodiment 1 further includes a main controller 35 for controlling each section en bloc, and a display unit 36 for displaying a radiological image. The main controller 35 has a CPU, and realizes the mapping section 18 and the calibration section 19 by executing various programs. The above sections may each be divided into a controller that performs their functions. An input unit 38 inputs operator's instructions. For instance, the input unit 38 receives change of setting the MRD, for instance, by the operator. The input unit corresponds to the input device in this invention.

<Configuration of Coincidence Section>

Description will be given of configurations of the C-coincidence section 20c and the D-coincidence section 20d as the most characteristic features in this invention. As shown in FIG. 4, the C-coincidence section 20c and the D-coincidence section 20d according to Embodiment 1 have a C filter 21c and a D filter 21d, respectively. The D-coincidence section 20d is provided in each of the ring units 121, 122, 123. The D-coincidence section 20d counts the number of coincidence events when two scintillation counter crystals belonging to each ring unit used by the D-coincidence section 20d detect an annihilation-gamma-rays pair. Moreover, the C-coincidence section 20c is connected to the ring units 121, 122 adjacent to each other. The C-coincidence section 20c counts the number of coincidence events when two scintillation counter crystals belonging to different ring units detect an annihilation-gamma-rays pair. The C filer 21 is provided across the adjacent ring units. Another C filter 21c is also provided on the ring units 122, 123 adjacent to each other.

The number of coincidence sections is as follows. Assumed that the number of ring units forming the detector ring 12 is n, the radiation tomography apparatus 9 is provided with the D-coincidence sections 20d of the number n, and the C-coincidence sections 20c of the number n−1.

The clock 23 outputs time information to the D filter 21d and the C filter 21c. FIG. 4 shows the clock 23 as if it is connected only to a single D filter 23d. However, the clock 23 is actually connected to all filters provided in the radiation tomography apparatus 9.

The D-coincidence section 20d has an LOR specifying section 22 and a fluorescence intensity calculation section 24 downstream of the D filter 21d. Moreover, the C-coincidence section 20c also has an LOR specifying section 22 and a fluorescence intensity calculation section 24 downstream of the C filter 21c. The output of the fluorescence intensity calculation section 24 is to be sent to the data storage section 17. The data outputted from the fluorescence intensity calculation section 24 is data associated with LORs, detection time, and detection intensity. Here in FIG. 4, the LOR specifying section 22 and the fluorescence intensity calculation section 24 as a portion of the coincidence section are omitted for simple explanation.

Description will be simply given of data processing in the radiation tomography apparatus 9. It is assumed that one annihilation gamma-ray pair enters from a vanishing point in FIG. 4 into two different points of the ring unit 121 in the detector ring 12. Then, the ring unit 121 outputs two detecting signals into the D filter 21d provided therein, and determines the fact that two annihilation gamma-rays enter the ring unit 121 coincidentally. Here, the coincident property is determined with use of the clock 23. That is, temporal data is applied to the detection signals outputted from the clock 23.

The temporal data applied to two detection signals are within a single time window, it is determined that pairing is conducted to the two detection signals, and the detection signals are generated from the annihilation gamma-ray pair. The two detection signals determined as annihilation gamma-rays pass through the D filter 21d, and are sent to the LOR specifying section 22. Here, LOR is the abbreviation for Line of response, and is a line connecting two scintillation counter crystals into which annihilation gamma-rays enter. The LOR also be expressed as positional information in the annihilation gamma-rays. The fluorescence intensity calculation section 24 specifies fluorescence intensity in each scintillation counter crystal.

In this way, the D filter 21d passes each detection signal only when two gamma rays coincidentally enter into any of the ring units used by the D-filter 21d, and disposes of detection data on gamma rays to which pairing is not conducted.

Description will be given in detail of a role of the D filter 21d. Here, it is assumed that the ring unit 121 has ten scintillation counter crystals arranged in the z-direction, as shown in FIG. 5(a). Consider a scintillation counter crystal Cr belonging to the ring unit 121. The ring unit 121 has ten unit detector rings 12b arranged therein, and accordingly, the LORs of the scintillation counter crystal Cr have ten types of LORs, i.e., LOR 1d to LOR 10d where the D filter 21d passes detection signals. Even when the scintillation counter crystal Cr detects gamma rays, the D filter 21d disposes of detection signals outputted from the scintillation counter crystal Cr so long as no scintillation counter crystal exists in the ring unit 121 to which pairing may be conducted.

The C filter 21c also has a role similar to the D filter 21d. However, the C filter 21c differs from the D filter 21d in the following. That is, the LORs that the scintillation counter Cr has and where the C filter 21c passes detection signals include twenty types of LORs, i.e., LOR 1c to LOR 20c between the scintillation counter crystal Cr and the scintillation counter crystal belonging to either the ring unit 122a or 122b adjacent to the ring unit 121 (see FIG. 5(b).) In other words, even when the scintillation counter crystal Cr detects gamma rays, the C filter 21c between the ring units 121, 122a disposes of detection signals on the scintillation counter crystal Cr so long as no scintillation counter crystal exists in the ring unit 122a to which pairing may be conducted. Similarly, even when the scintillation counter crystal Cr detects gamma rays, the C filter 21c between the ring units 121, 122b disposes of detection signals on the scintillation counter crystal Cr so long as no scintillation counter crystal exists in the ring unit 122b to which pairing may be conducted. Here, the LOR 1c to LOR 10c are LORs where the C filter 21s across the ring units 122a, 121 passes detection signals, whereas the LOR 11c to LOR 20c are LORs where the C filter 21s across the ring units 121, 122b passes detection signals. The ring unit 121 corresponds to the first ring unit in this invention. The ring units 122a, 122b correspond to the second ring unit in this invention.

As above, thirty types of LORs, i.e., LOR 1d to LOR 10d and LOR 1c to LOR 20c are used for coincidence. The data storage section 17 in FIG. 1 stores frequency of detecting the annihilation gamma-ray pair in each LOR.

As above, detector signals are disposed of per ring unit. Accordingly, even when the scintillation counter crystal, apart by three ring units (by thirty scintillation counter crystals in FIG. 5) or more in the z-direction, detects gamma rays coincidentally, the detection signals are disposed of prior to traveling toward the LOR specifying section 22.

Figure 6:
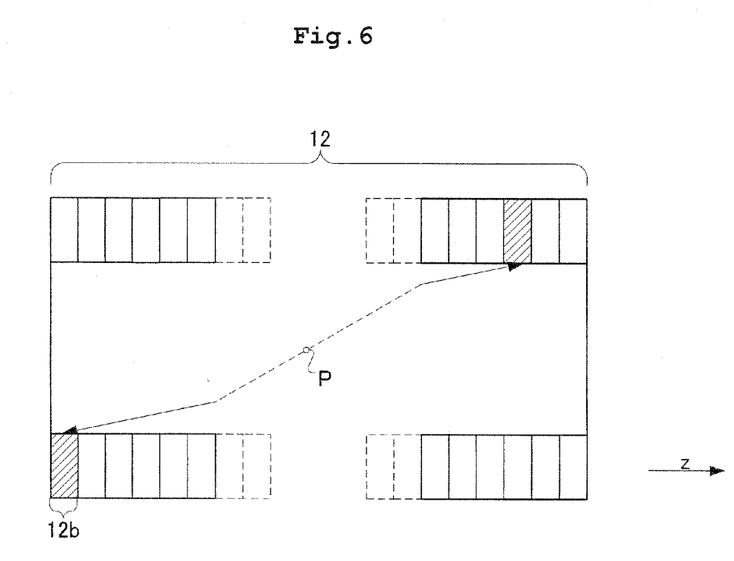

Performance of coincidence in the LOR connecting the scintillation counter crystals far apart in the z-direction does not so much contribute to clarifying the sectional image. That is, as shown in FIG. 6, annihilation gamma rays enter into two scintillation counter crystals apart in the z-direction. Here, annihilation gamma rays are to enter into the scintillation counter crystals further along the z-direction. As show in FIG. 6, less doses of gamma rays enter into an incident surface of the scintillation counter crystal at a sharp angle, which causes an S/N ratio of a worse value. Such LOR performs no coincidence. Consequently, it is preferable not to consider such LOR originally. In Embodiment 1, gamma rays entering at a sharp angle into the incident surface of the scintillation counter crystal are ignored. That is, only the LOR selected through operation of the C filter 21c and the D filter 21d is suitable for acquisition of a radiological image. Accordingly, burden on the LOR specifying section 22 and the fluorescence intensity calculation section 24 may be further suppressed.

<Operation of Radiation Tomography Apparatus>

Next, description will be given of operations of radiation tomography apparatus 9 according to Embodiment 1. Upon conducting of examinations with the radiation tomography apparatus 9 according to Embodiment 1, firstly the subject M with radiopharmaceutical administered thereto by injection in advance is laid on the top board 10. Then, the top board 10 slides to move the subject M into an opening of the gantry 11. From here, the annihilation gamma-ray pair emitted from the subject M is detected. Here, a site to be imaged of the subject M is completely housed inside the gantry 11. The top board 10 does not move during radiation detection.

The C-coincidence section 20c and the D-coincidence section 20d send detection data to the data storage section 17 successively. The data storage section 17 stores a number of times that the coincidence section outputs detection data for each LOR specified with the coincidence section. The data storage section 17 stores a number of times that an annihilation gamma ray pair is measured per LOR (a number of coincidence events.) The data storage section 17 stores the LOR and the number of counting annihilation gamma ray pairs that are associated with each other. The mapping section 18 constructs the associated data to acquire a sectional image (PET image.) The sectional image of the subject M generated as above is outputted to the calibration section 19. The calibration section 19 performs data processing for removing the false image superimposed on the sectional image of the subject M. The display unit 36 displays a completion image acquired in this way. As noted above, an inspection with the radiation tomography apparatus 9 according to Embodiment 1 is to be completed.

As above, the configuration of Embodiment 1 includes two or more ring units. Each of the ring units is provided with the D-coincidence section 20d. The D-coincidence section 20d counts the number of coincidence events for the ring units. In addition to this, Embodiment 1 includes the C-coincidence section 20c connected to both the ring units adjacent to each other. The C-coincidence section 20c counts the number of coincidence events only when two scintillation counter crystals belonging to each of the ring units adjacent to each other coincidentally detect radiation.

The D-coincidence section 20d is provided per ring unit, which may avoid complicated calculation even when the detector ring 12 has a large width. In other words, the ring units herein with a similar configuration to the radiographic apparatus conventionally used are connected. In so doing, two or more D-coincidence sections 20d share counting of the number of coincidence events per ring unit in the radiation tomography apparatus 9 concerning Embodiment 1 even when the scintillation counter crystals in the detector ring 12 increase in number. Consequently, arithmetic load concerning per D-coincidence section 20*d* never varies independent of the increased number of ring units.

The configuration of Embodiment 1 is also provided with the C-coincidence section 20*c*. When the ring units are connected, annihilation radiation may enter into each of the ring units adjacent to each other. According to Embodiment 1, the C-coincidence section 20*c* counts the number of annihilation gamma-ray pairs. Accordingly, the counted annihilation gamma-ray pairs used for generating the sectional image increase in number.

With the D-coincidence section 20*d* and the C-coincidence section 20*c*, only annihilation gamma-ray pairs may be selectively counted that are suitable for generating the sectional image. Assumed that two scintillation counter crystals detect radiation coincidentally in the detector ring. Then, the larger the distance becomes between the scintillation counter crystals in the z-direction, the fewer the detection frequency becomes and the lower the gamma-ray detection sensitivity becomes. Thus, it is preferable not to consider combination of such scintillation counter crystals originally in a coincidence step. According to Embodiment 1, coincidence is performed only when two scintillation counter crystals that detect radiation coincidentally (A) belong to the same ring unit, or (B) belong to each of the ring units adjacent to each other. Accordingly, the distance between the scintillation counter crystals in the z-direction is merely of a thickness in the z-direction of the ring unit. With the configuration of Embodiment 1, an annihilation gamma-ray pair that is not suitable for generating the sectional image is not originally under consideration. Consequently, the radiation tomography apparatus 9 may be provided that allows generation of the sectional image suitable for diagnosis while arithmetic load is suppressed.

Moreover, the foregoing detector ring 12 may be mechanically disassembled per ring unit. Such configuration may provide the radiation tomography apparatus 9 with easier maintenance and simple installation in an examination room. According to the foregoing configuration, the detector ring 12 may be divided into two or more ring units for transportation. Moreover, when the radiation tomography apparatus 9 is out of order, inside of the detector ring 12 may readily be inspected. That is because the detector ring 12 may be divided per ring unit. Moreover, the detection ring may be repaired through replacing the ring unit.

Embodiment 2

Figure 7:
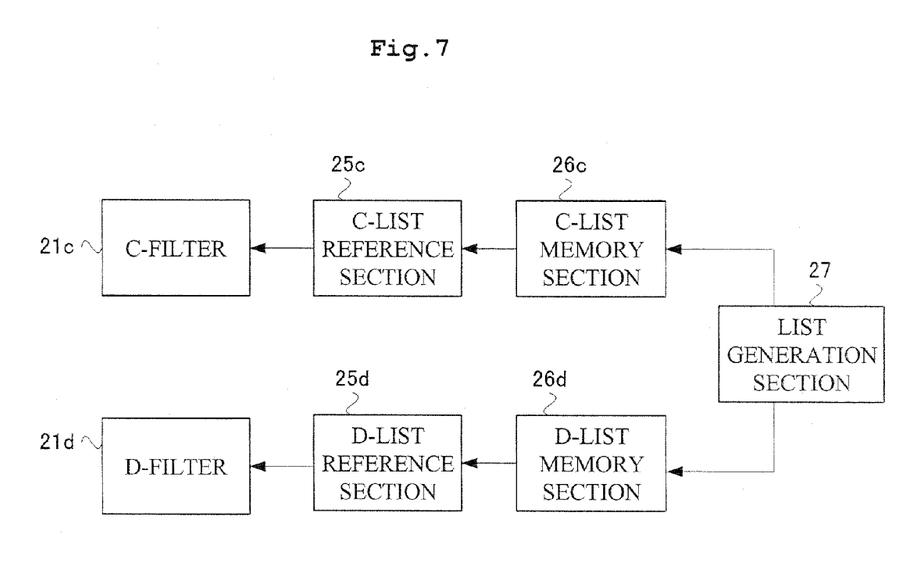
FIG. 7 is a functional block diagram showing a configuration of radiation tomography apparatus according to Embodiment 2.

Next, description will be given of a configuration of radiation tomography apparatus 9 according to Embodiment 2. That is, Embodiment 2 has the same configuration as Embodiment 1, but differs therefrom in a C-list reference section 25*c* and a C-list memory section 26*c* provided in each C filter 21*c*, as shown in FIG. 7. Another difference is that a D-list reference section 25*d* and a D-list memory section 26*d* are provided in each D-filter 21*d*. The C-list memory section corresponds to the list memory device in this invention. The C-list reference section corresponds to the counting instruction device in this invention.

Embodiment 2 may dispose of more detection signals than Embodiment 1. Here, detection signals disposed of in Embodiment 1 may be disposed of as they are. In addition to this, Embodiment 2 has a configuration in which detection signals are additionally disposed of in accordance with the list memorized in the list memory section.

Figure 8:
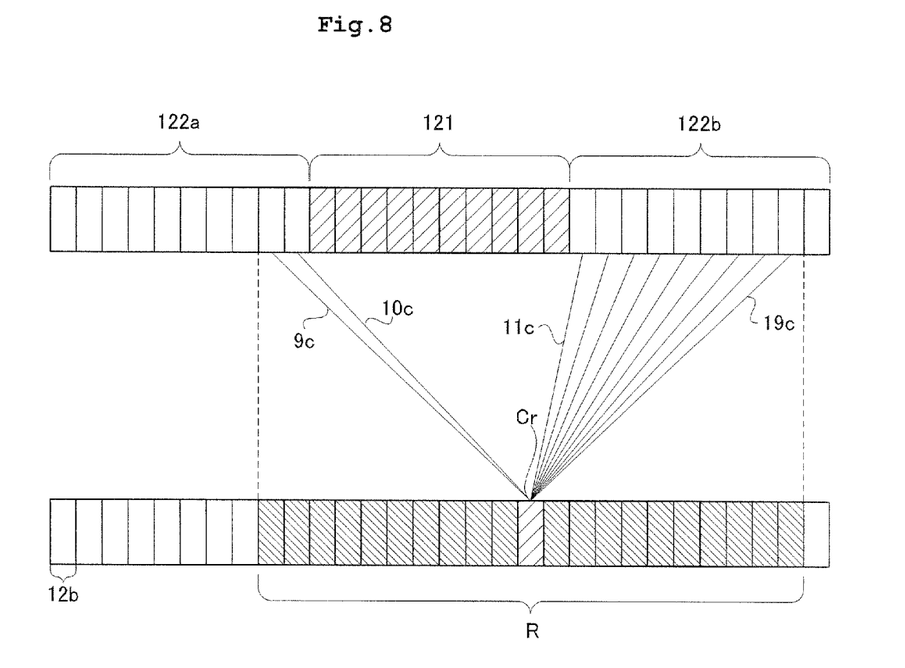
FIG. 8 is a schematic view showing operation of a filter according to Embodiment 2.

FIG. 8 shows disposal of detection signals in the radiation tomography apparatus according to Embodiment 2. For instance, consider an LOR having relationship with the scintillation counter crystal Cr. The region R in FIG. 8 has a width of ten scintillation counter crystals each from the scintillation counter crystal Cr in backward and forward directions in the z-direction. Specifically, the region R has a width of twenty-one scintillation counter crystals summing (A) the unit detection ring 12*b* to which the scintillation counter crystal Cr belongs, (B) ten unit detection rings 12*b* located forward of the scintillation counter crystal Cr in the z-direction, and (C) ten unit detection rings 12*b* located backward of the scintillation counter crystal Cr in the z-direction. The number of detector rings in consideration of the LORs has a maximum number of different detector rings referred to as MRD (Maximum ring difference.) In the case above, MRD=10. Accordingly, MRD is zero where the number of unit detection rings in consideration of the LORs is 1. The radiation tomography apparatus 9 according to Embodiment 2 may read the MRD stored in the MRD storage section 37. Some types of lists are memorized in the C-list memory section 26*c* and the D-list memory section 26*d*. A list suitable for reference is sent out to the C-list reference section 25*c* and the D-list reference section 25*d* in accordance with the MRD. Here, the MRD is variable. The operator resets MRD stored in the MRD storage section 37 via the input unit 38, thereby adjusting a width of the region R.

Figure 5:
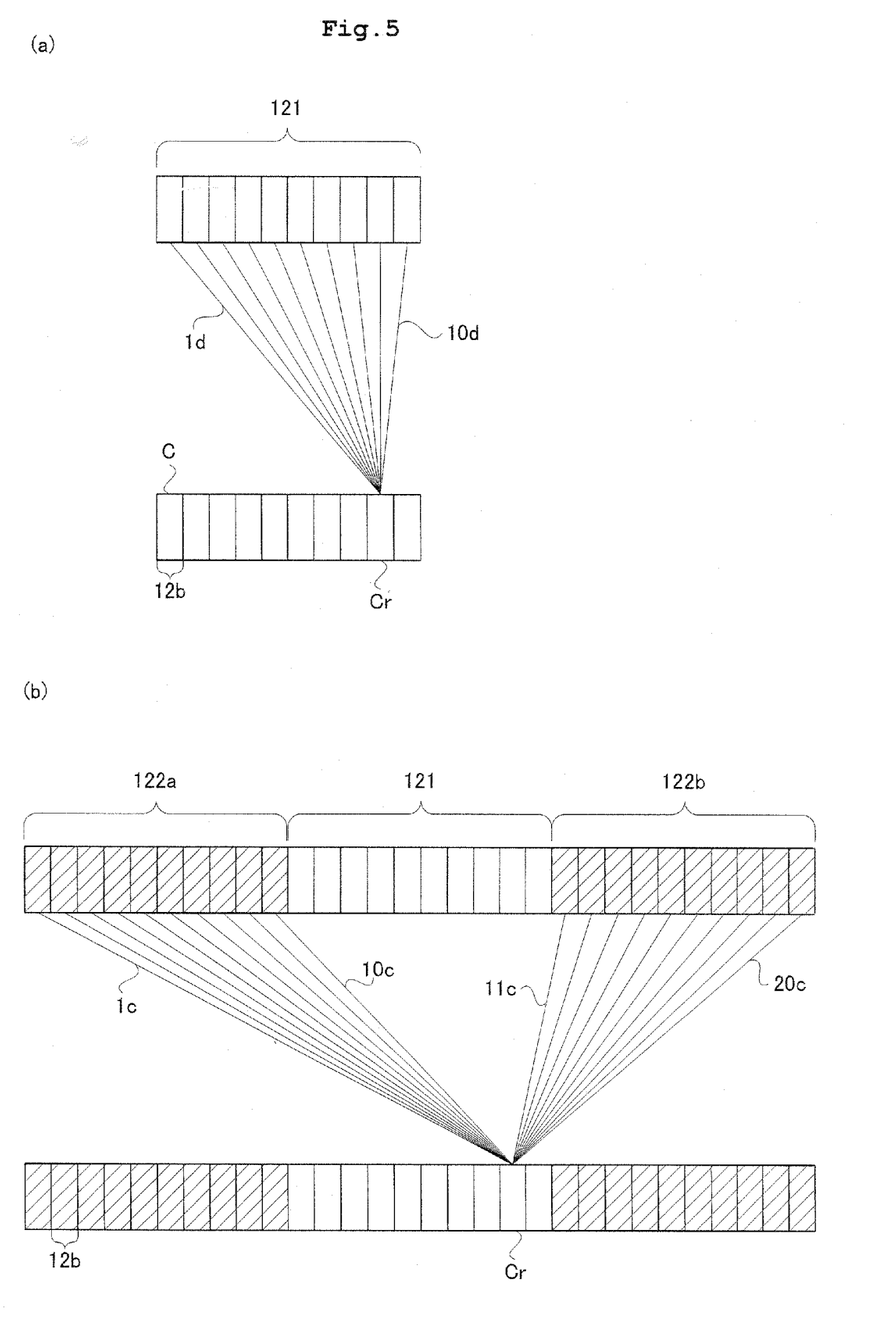
FIGS. 5 and 6 are schematic views each showing operation of a filter according to Embodiment 1.

The C filter 21*c* disposes of detection signals where the LOR does not lie within the region R in FIG. 8. Specifically, as shown in FIG. 5 in Embodiment 1, there are ten types of LORs, i.e., LOR 1*c* to LOR 10*c* between the ring unit 122*a* and the scintillation counter crystal Cr. Here, detection signals having relationship with the LOR 1*c* and LOR 8*c* are LORs out of the region R, and thus they are to be disposed of.

Similarly, in FIG. 5, there are ten types of LORs, i.e., LOR 11*c* to LOR 20*c* between the ring unit 122*b* and the scintillation counter crystal Cr. Here, detection signals having relationship with the LOR 20*c* are LORs out of the region R, and thus they are to be disposed of.

Accordingly, twenty-one types of LORs (2×MRD+one types), i.e., LOR 1*d* to LOR 10*d* (see FIG. 5(*a*)), and LOR 9*c* to LOR 19*c* (see FIG. 8) are used for coincidence. The data storage section 17 in FIG. 1 stores the frequency of detecting annihilation gamma-ray pairs for each LOR.

The C-list reference section 25*c* performs selection of the LOR in accordance with the MRD as above. Specifically, the C-list reference section 25*c* refers to the C-list memorized in the C-list memory section 26*c*, and instructs the C filter 21*c* to dispose of detection signals on the LOR 1*c* to LOR 8*c* and LOR 20*c*.

The C-list has listed combination of scintillation counter crystals correspond to the given MRD. Specifically, where MRD is 10, the C-list has listed combination of scintillation counter crystals on LOR 9*c* to LOR 19*c* with respect of the scintillation counter crystal Cr. Here, no combination is listed of the scintillation counter crystals on LOR 1*c* to LOR 8*c* and LOR 20*c*. The C filter 21*c* additionally disposes of the above detection data in accordance with instructions from the C-list reference section 25*c*.

The D-list reference section 25*d*, the D-list memory section 26*d*, and the D-list memorized therein are the same as the C-list reference section 25*c*, the C-list memory section 26*c*, and the C-list memorized therein, respectively, in configuration, and explanation thereon is to be omitted. These cancel detection data in consideration of the MRD in the ring unit 121 to which the scintillation counter crystal Cr belongs.

Finally, description will be given of the configuration of the list generation section 27 in FIG. 7. The list generation section 27 generates the C-list and the D-list for every MRD. The D-list is generated through listing only combination of two scintillation counter crystals having a distance in the z-direction only within a range specifying by the MRD from combination of two scintillation counter crystals belonging to a single ring unit. The C-list is generated through listing only combination that having a distance in the z-direction two scintillation counter crystals only within a range specifying by the MRD from combination of two scintillation counter crystals belonging to each of the ring units adjacent to each other. The list generation section corresponds to the list generation device in this invention.

As noted above, adoption of the configuration in Embodiment 2 may realize further suppression of arithmetic load in the radiation tomography apparatus. Specifically, although two scintillation counter crystals that detect radiation coincidentally belong to each of the ring units adjacent to each other, the C-coincidence section 20c performs coincidence only when the distance therebetween is equal to or less than the length specified by the MRD. Such configuration may provide radiation tomography apparatus with further suppressed arithmetic load. That is, execution of counting is instructed to the C-coincidence section 20c with use of the C-list in which combination of two scintillation counter crystals is listed. In so doing, the C-coincidence section 20c may perform coincidence only when combination of the two scintillation counter crystals that detect radiation coincidentally is memorized in the C-list. Only a pair of scintillation counter crystals having a distance equal to or less than the length specified by the MRD may be listed up in the C-list. Accordingly, the two scintillation counter crystals may easily have a distance therebetween in the z-direction of equal to or less than the length specified by the MRD.

Embodiment 3

Next, description will be given of a PET/CT device according to Embodiment 3. The PET/CT device includes the radiation tomography apparatus (PET device) 9 described in Embodiment 1 and Embodiment 2, and a CT device for generating a sectional image using X-rays, and is medical apparatus that allows generation of a composite image having superimposed sectional images acquired in both devices.

Figure 9:
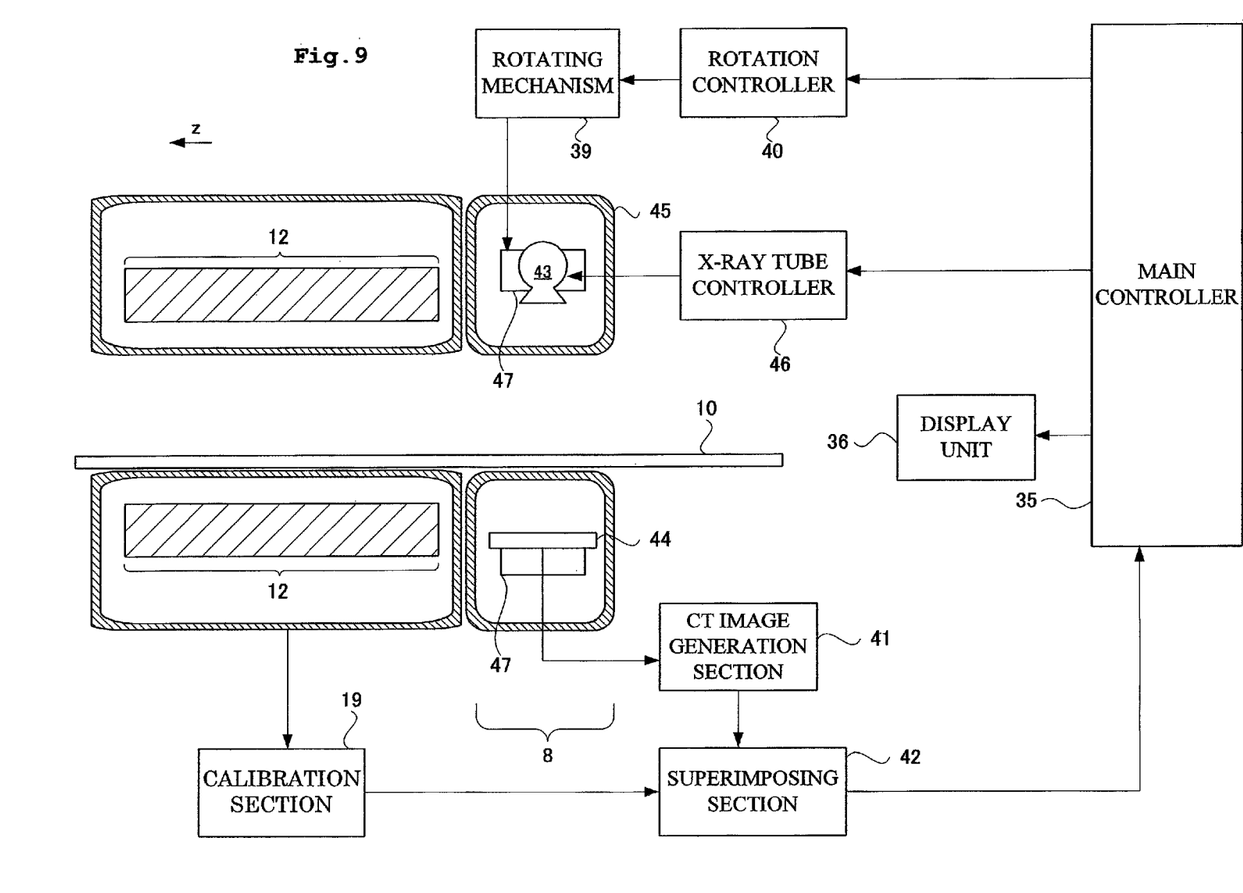
FIG. 9 is a functional block diagram showing a configuration of PET/CT apparatus according to Embodiment 3.

Here, description will be given of a configuration of the PET/CT device according to Embodiment 3. The radiation tomography apparatus (PET device) 9 described in Embodiment 1 or Embodiment 2 may be used for the PET/CT device according to Embodiment 3. Consequently, description will be given of the CT device as a characteristic portion in Embodiment 3. As shown in FIG. 9, the CT device 8 has a gantry 45. The gantry 45 is provided with an opening extended in the z-direction with a top board 10 inserted therein.

The gantry 45 has inside thereof an X-ray tube 43 for irradiating a subject with X-rays, an FPD (flat panel detector) 44, and a support portion 47 for supporting the X-ray tube 43 and the FPD 44. The support portion 47 has a ring shape, and freely rotates about the z-axis. A rotating mechanism 39 formed of a power generation device such as a motor and a power transmission device such as a gear performs rotation of the support portion 47. A rotation controller 40 controls the rotating mechanism 39. The X-ray tube corresponds to the radiation source in this invention. The FPD corresponds to the radiation detecting device in this invention. The support portion corresponds to the support device in this invention. The rotating mechanism corresponds to the rotating device in this invention. The rotation controller corresponds to the rotation control device in this invention.

The CT image generation section 41 generates an X-ray sectional image of the subject M in accordance with X-ray detection data outputted from the FPD 44. The superimposing section 42 generates a superimposed image through superimposing the above X-ray sectional image and a PET image showing radiopharmaceutical distribution in the subject that is outputted from the radiation tomography apparatus (PET device) 9.

The CPU 35 performs execution of various programs to realize the mapping section 18, the calibration section 19 according to Embodiment 1 and Embodiment 2 as well as the rotation controller 40, the CT image generation section 41, the superimposing section 42, and the X-ray tube controller 46. The above sections may each be divided into a controller that performs their functions.

Now, description will be given of a method for acquiring an X-ray fluoroscopic image. The X-ray tube 43 and the FPD 44 rotates about the z-axis while a relative position therebetween is maintained. Here, the X-ray tube 43 intermittently irradiates the subject M with X-rays, and the CT image generation section 41 generates an X-ray fluoroscopic image for every irradiation. The two or more X-ray fluoroscopic images are constructed into a single sectional image with use of an existing back projection method, for example, in the CT image generation section 41.

Next, description will be given of a method of generating the composite image. In order to acquire the composite image with the PET/CT device, the site of interest in the subject M is introduced into the CT device to acquire an X-ray sectional image thereof. In addition to this, the site of interest in the subject M is introduced into the radiation tomography apparatus (PET device) 9 to acquire a PET image. The superimposing section 42 superimposes both images for completing the composite image. The display unit 36 displays the composite image. Accordingly, radiopharmaceutical distributions and the internal subject structure may be recognized simultaneously, which may result in provision of the sectional image suitable for diagnosis.

According to Embodiment 3, the radiation tomography apparatus 9 may be provided that allows acquisition of both images of pharmaceutical distribution and the internal subject structure. In general, a PET device may obtain information on pharmaceutical distribution. However, it may sometimes be necessary to conduct diagnosis referring to the sectional image having internal organs and tissue of the subject falling therein. According to the above configuration, both images of the internal structure of the subject M and pharmaceutical distribution may be acquired. Consequently, superimposing both images may realize generation of a composite image suitable for diagnosis.

This invention is not limited to the foregoing configuration, but may be modified as follows:

(1) In each of the foregoing embodiments, the scintillation counter crystal is composed of LYSO. Alternatively, the scintillation counter crystal may be composed of another materials, such as GSO ($Gd_2SiO_5$), may be used in this invention. According to this modification, a method of manufacturing a radiation detector may be provide that allows provision of a radiation detector of low price.

(2) The fluorescence detector in each of the foregoing embodiments is formed of the photomultiplier tube. This invention is not limited to this embodiment. This invention is not limited to this embodiment. A photodiode, an avalanche photodiode, a semiconductor detector, etc., may be used instead of the photomultiplier tube.

(3) In the foregoing embodiment, the top board is freely slidable. This invention is not limited to this. For instance, the top board may be fixed, whereas the gantry 11 may slide.

[Industrial Utility]

As described above, this invention is suitable for radiation tomography apparatus for medical uses.

The invention claimed is:

1. Radiation tomography apparatus comprising:
a detector ring formed by arranging two or more ring units as to share central axes of the two or more ring units, the two or more ring units each being formed by arranging unit detector rings having radiation detecting elements for detecting radiation arranged annularly as to share central axes of the unit detector rings,
a direct coincidence device for counting a number of coincidence events as a number of times that two different radiation detecting elements belonging to one of the two or more ring units detect radiation coincidently;
a cross coincidence device that is connected to both a first ring unit and a second ring unit adjacent to each other, and counts a number of coincidence events as a number of times that two different radiation detecting elements belonging to each of the first ring unit and the second ring unit detect radiation coincidently only when a distance between two radiation detecting elements in a direction of the central axes is equal to or less than a given length;
a given length storage device for storing the given length; and
an input device for inputting the given length,
the given length being variable in accordance with input by the input device.

2. The radiation tomography apparatus according to claim 1, wherein
the detector ring may be mechanically disassembled per ring unit.

3. The radiation tomography apparatus according to claim 2, further comprising:
a top board that extends in the central axis direction and is inserted into an inside portion of the detector ring,
the radiation tomography apparatus further comprising an image generation device including:
(A) a radiation source that allows rotation relative to the top board around the central axis;
(B) a radiation detecting device that allows rotation relative to the top board around the central axis;
(C) a support device for supporting the radiation source and the radiation detecting device;
(D) a rotating device for rotating the support device; and
(E) a rotation control device for controlling the rotating device.

4. The radiation tomography apparatus according to claim 1, comprising:
a list memory device for memorizing a list in which combination of two radiation detecting elements is listed; and
a counting instruction device for instructing execution of counting to the cross coincidence device, wherein
when two radiation detecting elements belonging to the first ring unit and the second ring unit coincidentally detect radiation, the counting instruction device instructs execution of counting to the cross coincidence device only when the combination of two detecting elements is in the combination list.

5. The radiation tomography apparatus according to claim 4, wherein
a list generation device is provided for generating the combination list based on the given length.

6. The radiation tomography apparatus according to claim 5, further comprising:
a top board that extends in the central axis direction and is inserted into an inside portion of the detector ring,
the radiation tomography apparatus further comprising an image generation device including:
(A) a radiation source that allows rotation relative to the top board around the central axis;
(B) a radiation detecting device that allows rotation relative to the top board around the central axis;
(C) a support device for supporting the radiation source and the radiation detecting device;
(D) a rotating device for rotating the support device; and
(E) a rotation control device for controlling the rotating device.

7. The radiation tomography apparatus according to claim 4, further comprising:
a top board that extends in the central axis direction and is inserted into an inside portion of the detector ring,
the radiation tomography apparatus further comprising an image generation device including:
(A) a radiation source that allows rotation relative to the top board around the central axis;
(B) a radiation detecting device that allows rotation relative to the top board around the central axis;
(C) a support device for supporting the radiation source and the radiation detecting device;
(D) a rotating device for rotating the support device; and
(E) a rotation control device for controlling the rotating device.

8. The radiation tomography apparatus according to claim 1, further comprising:
a top board that extends in the central axis direction and is inserted into an inside portion of the detector ring,
the radiation tomography apparatus further comprising an image generation device including:
(A) a radiation source that allows rotation relative to the top board around the central axis;
(B) a radiation detecting device that allows rotation relative to the top board around the central axis;
(C) a support device for supporting the radiation source and the radiation detecting device;
(D) a rotating device for rotating the support device; and
(E) a rotation control device for controlling the rotating device.

* * * * *